United States Patent
Clinton et al.

(10) Patent No.: US 9,305,446 B1
(45) Date of Patent: Apr. 5, 2016

(54) SECURITY CAMERA WITH INTERNAL SEALING ARRANGEMENT

(71) Applicants: Gary Blaine Clinton, Belvidere, IL (US); Daniel Blaine Clinton, Loves Park, IL (US)

(72) Inventors: Gary Blaine Clinton, Belvidere, IL (US); Daniel Blaine Clinton, Loves Park, IL (US)

(73) Assignee: Clinton Electronics Corporation, Loves Park, IL (US)

( * ) Notice: Subject to any disclaimer, the term of this patent is extended or adjusted under 35 U.S.C. 154(b) by 0 days.

(21) Appl. No.: 14/516,342

(22) Filed: Oct. 16, 2014

(51) Int. Cl.
*H04N 5/225* (2006.01)
*G08B 13/196* (2006.01)

(52) U.S. Cl.
CPC ........ *G08B 13/19619* (2013.01); *H04N 5/2252* (2013.01)

(58) Field of Classification Search
CPC ........... G08B 13/19619; H04N 5/2252; H04N 5/2251
See application file for complete search history.

(56) References Cited

U.S. PATENT DOCUMENTS

| | | | |
|---|---|---|---|
| 3,819,856 A * | 6/1974 | Pearl et al. | 348/151 |
| 2001/0022627 A1* | 9/2001 | Bernhardt | 348/373 |
| 2010/0272427 A1* | 10/2010 | Jung et al. | 396/427 |
| 2012/0008935 A1* | 1/2012 | Cheng et al. | 396/535 |

* cited by examiner

*Primary Examiner* — WB Perkey
(74) *Attorney, Agent, or Firm* — Reinhart Boerner Van Deuren P.C.

(57) ABSTRACT

A security camera is provided. The security camera includes an outer two-part housing having a front cover and a back cover. A camera assembly is disposed internally within the housing. The camera assembly includes a camera module carried by a support body. A seal arrangement is provided which seals the camera assembly from a portion of the interior of the camera housing, as well as the exterior. The security camera does not require the use of a sealing compound around its mounting holes when surface mounting the security camera using the mounting holes as a result of the sealing arrangement.

11 Claims, 7 Drawing Sheets

SECURITY CAMERA WITH INTERNAL SEALING ARRANGEMENT

FIELD OF THE INVENTION

This invention generally relates to security devices, and more particularly to security cameras.

BACKGROUND OF THE INVENTION

Security cameras are used in a variety of applications and operational environments. As one example, security cameras may be employed by a retail establishment to monitor for any criminal activity at the establishment. Indeed, such cameras may be employed in the interior of the retail establishment to monitor and prevent retail theft. Security cameras may also be employed in the exterior of the retail establishment, e.g. a parking lot, to monitor various activities.

Such exterior security cameras must be able to withstand the elements. Typically such cameras utilize a rugged exterior housing with an internal camera module. Because the internal camera module includes sensitive electronics, it is necessary to prevent the ingress of moisture and other contaminants, e.g. particulate matter, into the housing. The housing typically is a two-part assembly having a front cover and a back cover. The front cover usually includes a lens with which the optical sensors of the internal camera module are aligned with. The back cover usually includes a mounting hole pattern for surface mounting the camera to a wall or other flat surface using screws, bolts, rivets, or the like. The back cover may also include a conduit port for connection to electrical conduit that in turn carries wiring which extends into the housing and is operably connected to the camera module.

To prevent the aforementioned ingress of moisture and/or particulate matter, several areas of such a security camera must be sealed. First, a gasket is typically positioned at the union of the front and back housing covers to prevent the ingress of moisture at this location. Second, the hole pattern on the back cover must be sealed using a sealing substance such as room temperature vulcanizing (RTV) silicone. The conduit port typically utilizes water tight National Pipe Thread (NPT) threading to seal this port.

Achieving the seal between the front and back housing covers and the conduit port is relatively simple. To seal at the union of the front and back housing covers, the same are simply tightened together to compress the above discussed gasket. To seal at the conduit port, conduit is simply threaded into the port. Due to the NPT threading, a liquid tight seal is achieved at this region.

Unfortunately, sealing the hole pattern on the back cover is quite time consuming. Typically, this hole pattern incorporates a variety of holes and slots to offer an installer a variety of installation options to accommodate various installation location configurations. Each one of the holes and slots must be sealed using RTV silicone or a similar sealant. Such an operation is tedious and time consuming. Additionally, it has been found that one or more of these sealed locations on the back cover will often-times fail leading to the ingress of moisture and/or particulate matter, and ultimately, camera failure. As such, there is a need in the art for a security camera that reduces or entirely omits the above described back cover sealing operation to ultimately provide a relatively rapid-install, robust camera system for exterior use.

The invention provides such a security camera. These and other advantages of the invention, as well as additional inventive features, will be apparent from the description of the invention provided herein.

BRIEF SUMMARY OF THE INVENTION

In one aspect, embodiments of the present invention provide a security camera which allows for a substantial reduction in installation time as it is unnecessary to use a liquid sealing compound when surface mounting the camera. The embodiment of a security camera according to this aspect includes a housing having a front cover and a back cover. The back cover includes a mounting arrangement for mounting the security camera to a surface. A camera assembly is disposed within an interior of the housing. A sealing arrangement is arranged within the interior of the housing and configured to seal the camera assembly within the interior of the housing.

In certain embodiments, the camera assembly includes a camera module and a camera support body that receives the camera module. The support body is generally cylindrical in shape and includes a bottom wall, a sidewall depending upwardly from the bottom wall, and a radially extending flange extending radially outward from an end of the sidewall. The radially extending flange extends between top and bottom surfaces. A sealing rim extends axially away from the top surface. In certain embodiments, the sealing rim may extend away from the top surface of the flange such that it is generally perpendicular thereto. The front cover includes an axially extending flange proximal the sealing rim. A gasket is pinched between the sealing rim and the axially extending flange to form a seal.

In certain embodiments, the front cover includes a lens extending through an aperture formed in a ring member of the front cover. A first seal element is provided between the lens of the front cover and the ring member to form a seal therebetween.

In certain embodiments, the security camera also includes a second seal element provided within an aperture formed in the support body. The second seal element is arranged and configured to form a seal around lead wires of the camera assembly.

In another aspect, embodiments of the invention provide a security camera which presents a robust sealing arrangement for protecting an internal camera module of the security camera from exposure to fluid and particulate matter. An embodiment of such a security camera includes a housing having a front cover and a back cover. A camera assembly extends into a first interior space of the housing. The camera assembly includes a camera module and a support body. The support body and front cover define an enclosure bounding a second interior space. A seal arrangement seals the first interior space from the second interior space such that fluid and particulate matter flow from the first interior space into the second interior space is inhibited.

In certain embodiments, the seal arrangement includes a gasket positioned between the front cover and a radially extending flange of the support body. A sealing rim extends from the radially extending flange. The sealing rim is generally perpendicular to the flange. The front cover includes an axially extending flange proximal the sealing rim. The gasket is pinched between the sealing rim and the axially extending flange to form a seal.

In certain embodiments, the sealing arrangement further includes a first seal element positioned between a lens of the front cover and a ring member of the front cover to form a seal therebetween.

In certain embodiments, the sealing arrangement also includes a second seal element disposed within an aperture formed in a bottom wall of the support body. The second seal element is arranged and configured to seal against lead wires of the camera module extending through the aperture and into the first interior space.

The gasket and first and second seal elements are arranged such that the enclosure bounding the second interior space has an IP68 rating.

In yet another aspect, a method for assembling a security camera is provided. The method includes providing a housing having a front and a back cover. The method also includes situating a camera assembly within said housing such that it extends into a first interior space of the housing. The camera assembly comprises a camera module and a support body. The support body and front cover define an enclosure bounding a second interior space. The method also includes sealing, with a sealing arrangement, the first interior space from the second interior space such that fluid and particulate matter flow from the first interior space into the second interior space is inhibited.

In certain embodiments, the step of sealing includes positioning a gasket between the support body and the front cover of the housing, positioning a first seal element between a lens and a ring member of the front cover, and positioning a second seal element in a lead wire aperture of the support body.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Turning now to the drawings, embodiments of the invention herein present a novel security camera that overcomes the above discussed deficiencies by not requiring the use of a sealant in the mounting holes of the camera when surface mounting the same. The security camera is a relatively quick-install system in that it is no longer necessary to apply an RTV silicone or the like on each of the used and unused mounting holes/slots on the housing during installation. These advantages are achieved by way of a unique and inventive sealing arrangement disposed within an interior of the housing utilized by the security camera. These and other advantages will be described in greater detail below.

Figure 1:
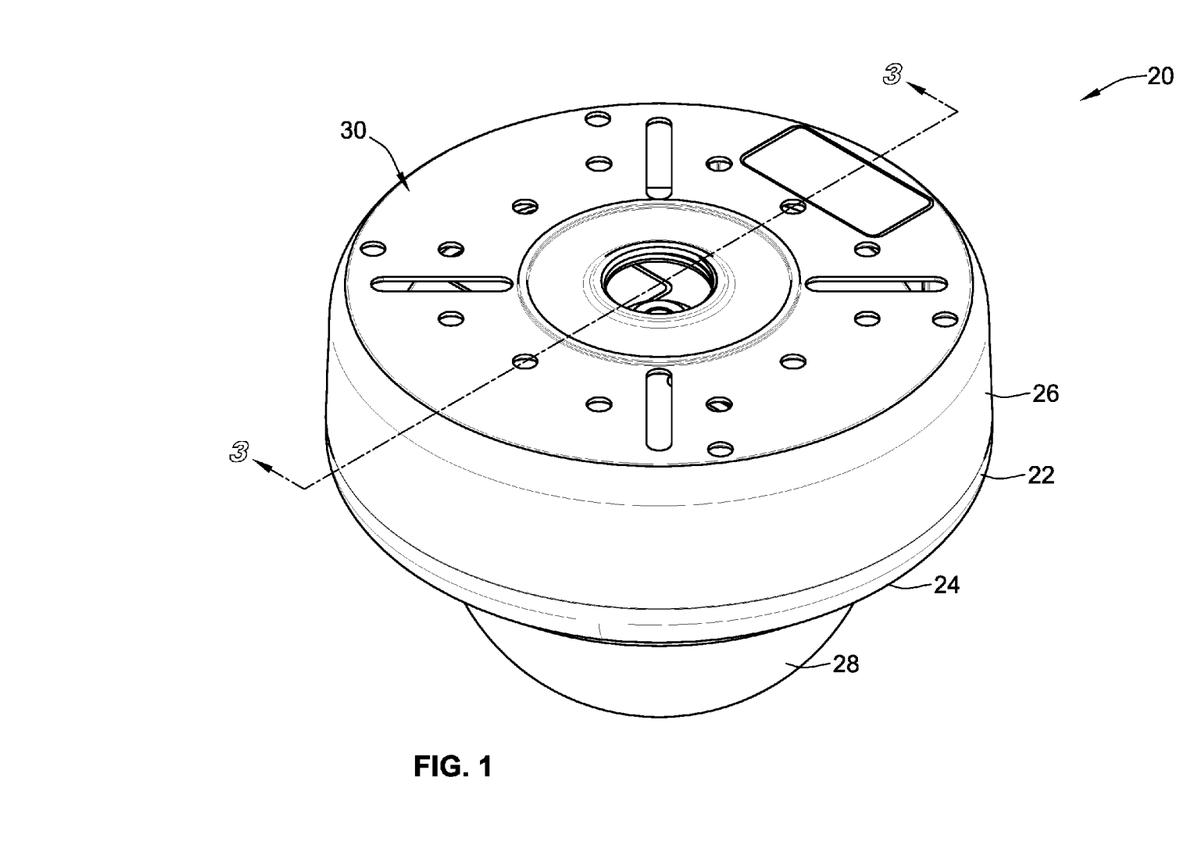
FIG. 1 is a perspective view of an embodiment of a security camera according to the teachings of the present invention.

With particular reference to FIG. 1, and embodiment of a security camera 20 according to the instant invention is illustrated therein. Security camera 20 includes a housing 22. Housing 22 includes a front cover 24 and back cover 26 which together house a camera assembly as described below. Front cover 24 includes a lens 28 to provide visibility to the camera assembly of security camera 20 to capture video data. Back cover 26 includes a mounting arrangement in the form of a plurality of holes and slots. This mounting arrangement is used to surface mount security camera 20 to a surface in a variety of orientations. The particular hole/slot pattern illustrated is non-limiting, as it will be readily recognized that various hole and slot patterns may be used depending upon application.

As will be described in greater detail below, however, it is not necessary to utilize a RTV silicone or the like with mounting arrangement 30 when mounting security camera 20 due to the above-introduced sealing arrangement.

Figure 2:
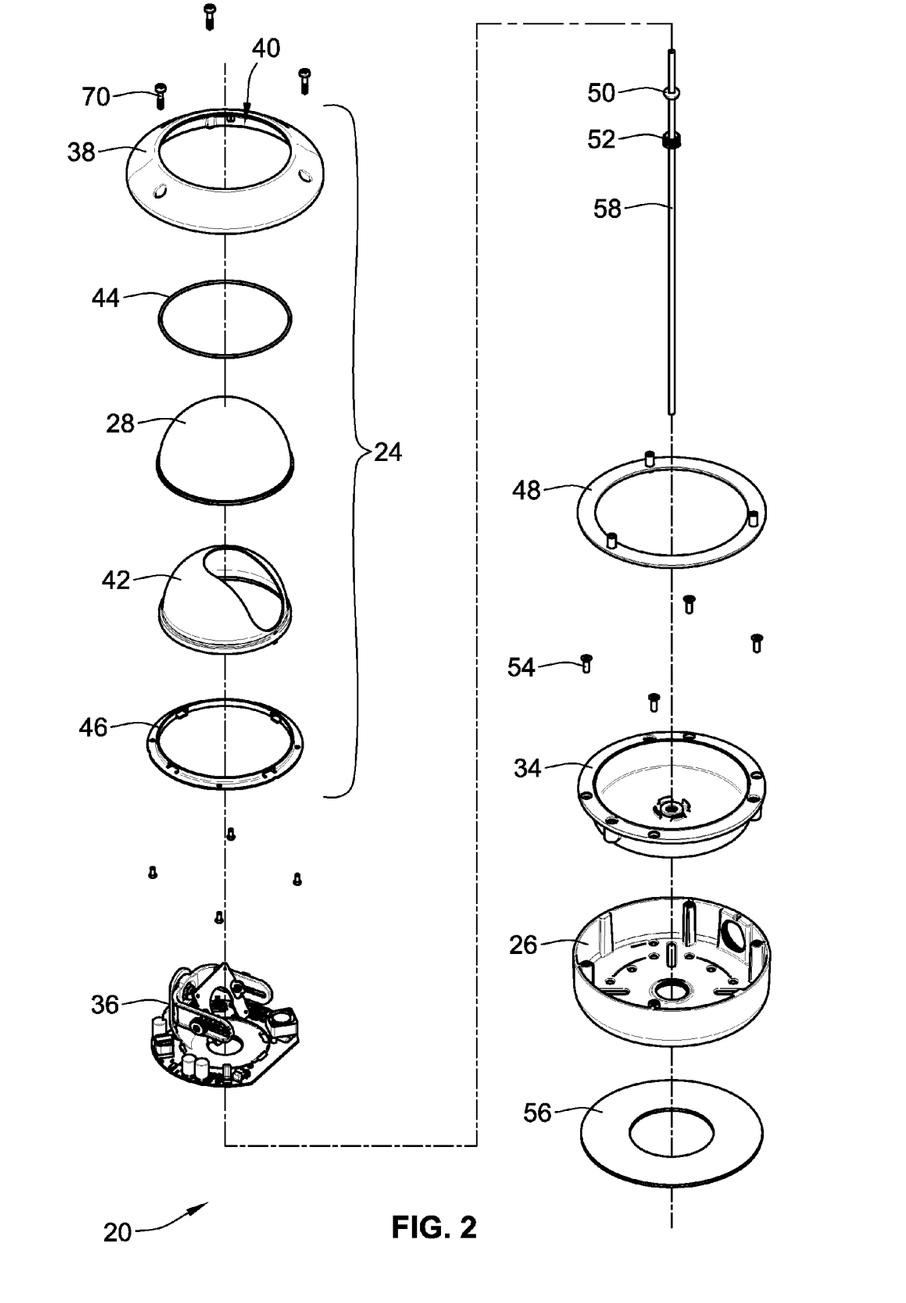
FIG. 2 is a perspective exploded view of the security camera of FIG. 1.

Turning now to FIG. 2, security camera 20 is illustrated in an exploded view. As introduced above, security camera 20 includes an internal camera assembly 32 (see FIG. 3). Camera assembly 32 includes a generally cup-shaped support body 34 which receives and supports a camera module 36. Camera module 36 includes all of the necessary mechanical, electronic and sensor componentry to take still and full motion video at any orientation and in a variety of viewing angles. Those skilled in the art will readily recognize that various camera modules may be utilized with security camera 20, and as such, the particular camera module 36 illustrated should be taken by way of example only.

As will be described in greater detail below, a portion of the above-introduced sealing arrangement is formed using camera assembly 32. As will also be described in greater detail below, the exposure of camera module 36 to fluids, including gases or liquids, as well as particulate matter is substantially inhibited by way of the above-introduced sealing arrangement. Indeed, fluids and particulate matter that may enter a first interior space of security camera 20 through the unsealed mounting holes and slots of mounting arrangement 30 (See FIG. 1) is substantially or in many cases entirely prevented from passing from this first interior space to a second interior space containing camera module 36. The same holds true for any fluids or particulate matter the exterior of security camera 20 may be exposed to.

A portion of the above-introduced sealing arrangement is also provided within front cover 24. Front cover 24 includes a ring member 38 with a central opening 40 formed therein for passage of a substantial portion of lens 28. Front cover 24 also includes a camera shroud 42 positioned directly adjacent lens 28 as shown. A mounting collar 46 biases shroud 42 and lens 28 against ring member 38. A first seal element in the form of an O-ring 44 is positioned between lens 28 and ring member 38 so as to prevent a leak path through opening 40 around lens 28 from an exterior of security camera 20 to the interior thereof.

O-ring 44 may be a conventional circular cross-section O-ring, as well as any other similar seal elements which may or may not have a circular cross-section. Indeed, it is contemplated that any type of O-ring or gasket may be utilized with only minor adaptation made to security camera 20 to accommodate the differing geometry of such a seal element.

A gasket 48 which also forms a portion of the above-introduced sealing arrangement forms a seal between camera assembly 32 and front cover 24. More specifically, and as described below, support body 34 biases gasket 48 against ring member 38 of front cover 24 to provide a seal therebetween. The seal provided by gasket 48 assists in preventing the passage of fluid and particulate matter from the above-introduced first interior space to the second interior space containing camera module 36, as well as from the exterior of security camera 20 to the second interior space of containing camera module 36.

Gasket 48 has a generally rectangular cross-section with mounting holes formed therein for securing gasket 48 to support body 34. It is contemplated that a variety of material may be utilized for gasket 48. As one non-limiting example, gasket 48 may be formed from silicone rubber having a durometer rating of Shore 30A. It has been found by the Applicants that the aforementioned material and its associated durometer rating provide an optimal sealing configuration. However, other materials with a different or the same durometer rating may be utilized.

The above-introduced sealing arrangement also includes a second seal element in the form of a grommet 50 which is secured within a threaded aperture of support body 34 by way of a threaded plug 52. Grommet 50 provides a seal around lead wires 58 which are illustrated schematically and extend from camera module 36 through support body 34 as well as through back cover 26 and a conduit port 60 (See FIG. 3) thereof. A vibration damping mounting pad 56 may also be utilized on a back surface of back cover 26 as shown. This component is optional, however.

Still referring to FIG. 2, to assemble security camera 20, gasket 48 is attached to support body 34. This sub-assembly is then installed on back cover 26 such a portion of camera assembly 32 extends into the cavity of back cover 26 shown in FIG. 2. Camera assembly 32 is mounted to back cover 26 by mounting fasteners 54. To complete assembly, front cover 24 is installed on the above described sub-assembly using mounting fasteners 70. As mounting fasteners 70 are tightened, gasket 48 is compressed between front cover 24 and the below described flange of support body 34.

Figure 3:
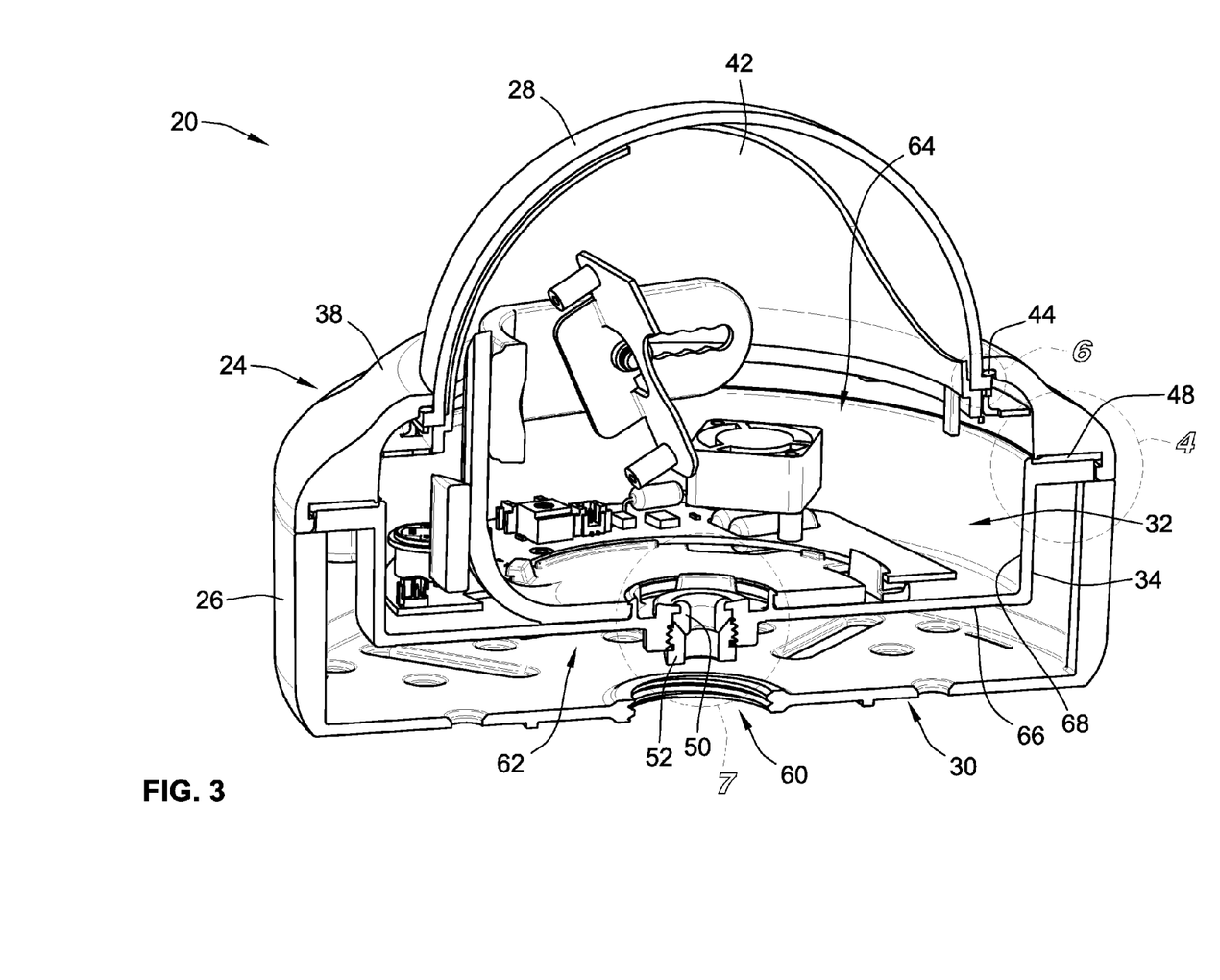
FIG. 3 is a perspective cross section of the security camera of FIG. 1.

Turning now to FIG. 3, security camera 20 is illustrated in a cross-sectional view to expose the interior thereof when assembled. As illustrated in this view, camera assembly 32 is partially disposed within first interior space 62 bounded in part by back cover 26. A second interior space 64 is bounded by support body 34 and front cover 24 within which camera module 36 is disposed.

As described above, the sealing arrangement of the instant invention substantially inhibits or entirely prevents fluid and particulate matter passage from the first interior space 62 to the second interior space 64 as well as from an exterior of security camera 20 to the interior thereof, and more particularly the second interior space 64. As also introduced above, this sealing arrangement includes a first seal element in the form of O-ring 44, a gasket 48, and a second seal element in the form of grommet 50. Gasket 48 and grommet 50 are biased into sealing engagement in whole or in part by support body 34. O-ring 44 forms a seal between lens 28 and ring member 38 of front cover 24. These seals are described in turn in the following.

Figure 4:
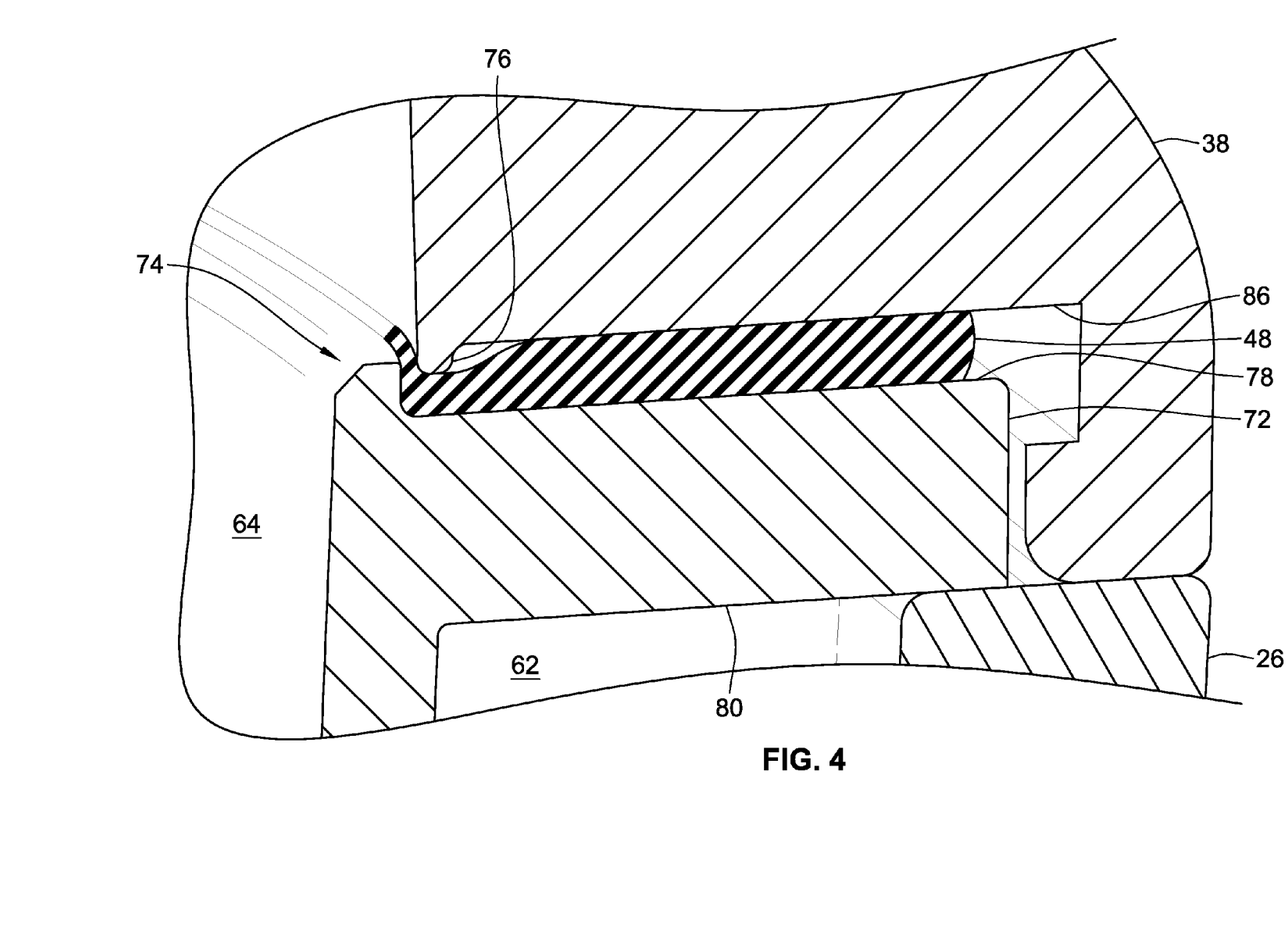
FIG. 4 is a partial view of the cross section of FIG. 3.

Support body 34 includes a bottom wall 66 with a side wall 68 depending upwardly therefrom. A radially extending flange 72 (See FIG. 4) extends radially outward from an end of sidewall 68 as shown. With particular reference now to FIG. 4, flange 72 includes a top surface 78 and a bottom surface 80. A sealing rim 74 extends axially away from top surface 78 as shown.

Ring member 38 includes an axial projection 76 extending generally downward as shown in FIG. 4 and proximal to sealing rim 74. As front cover 24 and back cover 26 (See FIG. 2) are joined to one another, an axial distance between sealing room 74 and axial projection 76 is reduced resulting in gasket 48 being pinched between these projections as illustrated in FIG. 4. Such a configuration provides a seal at this location.

As a result, the ingress of fluid and particulate matter which may enter security camera 20 at the union between front and back covers 24, 26 is prevented from continuing along into the second interior space 64 as shown. The same holds true for the ingress of fluid and particulate matter from first interior space 62 into second interior space 64 at the location of the above-described seal formed adjacent sealing rim 74 and axial projection 76. It will also be noted that an axial seal is formed along the width of gasket 48 between upper surface 78 of flange 72 and a seal surface 86 of ring member 38 as shown.

Figure 5:
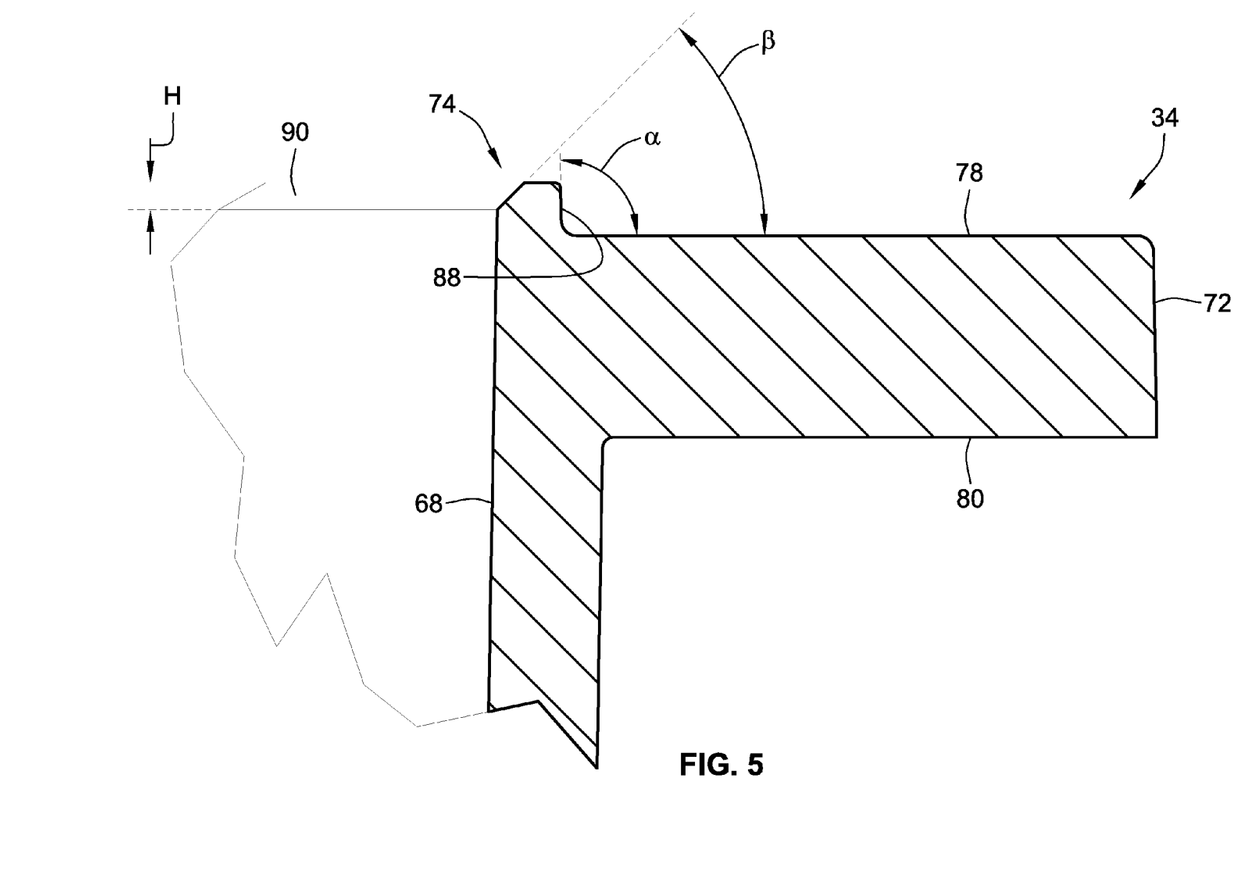
FIG. 5 is a partial view of a cross section of a support body of the security camera of FIG. 1.

Turning now to FIG. 5, the geometry of sealing rim 74 will be described in greater detail. Sealing rim 74 extends axially away from top surface 78 of flange 72 at a height H as shown. Height H may be any appropriately selected dimension, and in the illustrated embodiment is approximately 0.040 inches. The cross section of sealing rim 74 includes a radially outermost edge 88 of sealing rim 74 that forms an angle $\alpha$ with top surface 78. Angle $\alpha$ is approximately 90 degrees as shown in FIG. 5, but may also be less than or greater to 90 degrees in other embodiments. With momentary reference back to FIG. 4, the aforementioned sealing rim 74 provides for a folding of gasket 48 back against axial projection 76 as shown to enhance the sealing capabilities thereof.

A radially interior wall 90 of sealing rim 74 is chamfered such that it forms an angle $\beta$ with top surface 78 as shown. In the illustrated embodiment, angle $\beta$ is approximately 45 degrees, however, other chamfer angles are contemplated.

Figure 6:
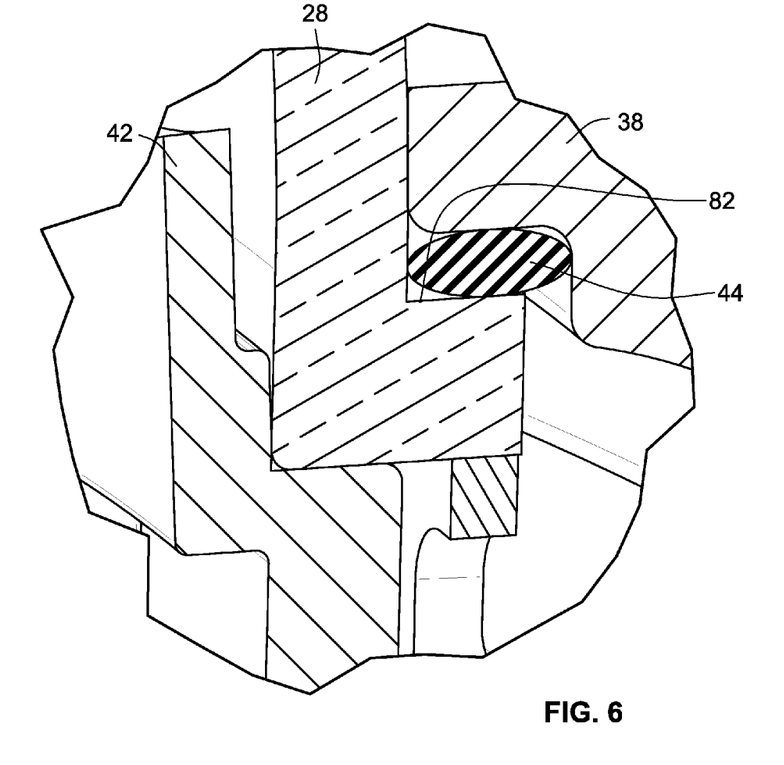
FIG. 6 is a partial view of the cross section of FIG. 3.

Turning now to FIG. 6, O-ring 44 and its associated seal are described in greater detail. As can be seen in the cross-section of FIG. 6, O-ring 44 is positioned on a rim 82 formed in lens 28. Ring member 38 sealingly engages O-ring 44 such that a seal is formed between lens 28 and ring member 38. As a result, the ingress of fluid and particulate matter at this location is substantially eliminated or eliminated entirely. As discussed above, although illustrated as having a circular cross-section, other seal elements other than a conventional circular O-ring may be utilized at this location. As such, the foregoing should be taken by way of example only and not limitation.

Figure 7:
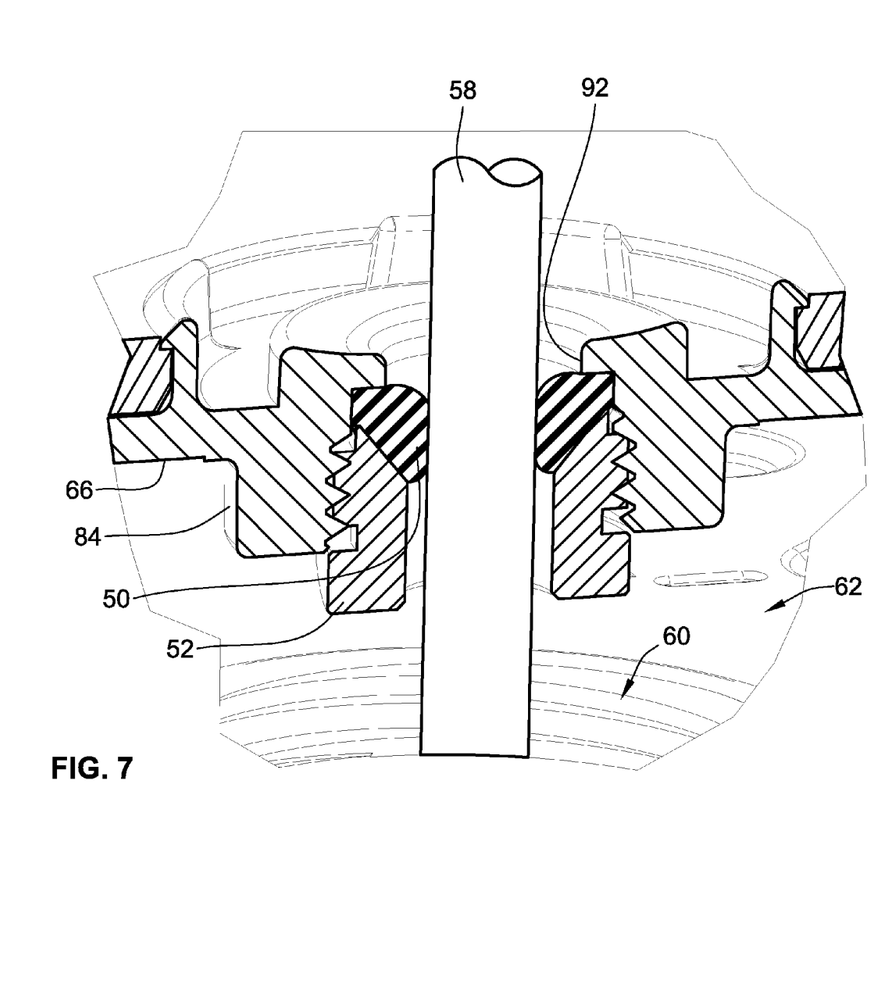
FIG. 7 is a partial view of the cross section of FIG. 3.

Turning now to FIG. 7, grommet 50 will be described in greater detail. As discussed above, a plug 52 biases grommet 50 within a threaded aperture 84 as shown. Threaded aperture 84 includes a rim 92. As threaded plug 52 is inserted into threaded aperture 84 grommet 50 is biased against rim 92. This causes a diameter of a central aperture 94 formed through grommet 50 to decrease and thus sealingly engage lead wires 58 as shown. The seal at this region prevents the ingress of fluid and particulate matter from traveling along lead wires 58 and into second interior space 64 containing camera module 36. (See also FIG. 3).

Having described the structural attributes of security camera 20, it will be readily recognized that it is no longer necessary to employ the time consuming operation of sealing the mounting holes on the back cover 26 of housing 22 of security camera 20. Indeed, the above-described sealing arrangement formed by O-ring 44, gasket 48, and grommet 50 substantially eliminates or prevents entirely the ingress of fluid and particulate matter into an interior space of security camera 20 containing a camera module 36 which has contaminant sensitive electronic components. This sealing arrangement, in one embodiment, provides an Ingress Protection rating of IP 68. As such, security camera 20 readily utilized in outdoor applications, but unlike prior designs, does not require the labor intensive sealing procedures associated therewith.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A security camera, comprising:
    a housing having a front cover and a back cover, wherein the back cover includes a mounting arrangement for mounting the security camera to a surface;
    a camera assembly disposed within an interior of the housing; and
    a sealing arrangement arranged and configured to seal the camera assembly within the interior of the housing
    wherein the camera assembly includes a camera module and a camera support body that receives the camera module;
    wherein the support body is generally cylindrical in shape and includes a bottom wall, a sidewall depending upwardly from the bottom wall, and a radially extending flange extending radially outward from an end of the sidewall;
    wherein the radially extending flange extends between top and bottom surfaces, and wherein a sealing rim extends axially from the top surface;
    wherein the sealing rim extends axially away from the top surface such that is generally perpendicular to said top surface; and
    wherein the front cover includes an axially extending flange proximal the sealing rim, and wherein a gasket is pinched between the sealing rim and the axially extending flange.

2. The security camera of claim 1, wherein the front cover includes a lens extending through an aperture formed in a ring member of the front cover.

3. The security camera of claim 2, further comprising a first seal element between the lens of the front cover and the ring member forming a seal therebetween.

4. The security camera of claim 1, further comprising a second seal element provided within an aperture formed in the support body.

5. The security camera of claim 4, wherein the second seal element is arranged and configured to form a seal around leadwires of the camera assembly.

6. A security camera, comprising:
    a housing having a front cover and a back cover;
    a camera assembly extending into a first interior space within an interior of the housing, the camera assembly comprising a camera module and a support body, the support body and front cover defining an enclosure bounding a second interior space;
    a sealing arrangement sealing the first interior space from the second interior space such that fluid and particulate matter flow from the first interior space into the second interior space is inhibited;
    wherein the sealing arrangement comprises a gasket positioned between the front cover and a radially extending flange of the support body;
    wherein a sealing rim extends from the radially extending flange;
    wherein the sealing rim extends axially away from the flange such that it is perpendicular thereto; and
    wherein the front cover includes an axially extending flange proximal the sealing rim, and wherein the gasket is pinched between the sealing rim and the axially extending flange.

7. The security camera of claim 6, wherein the sealing arrangement further comprises a first seal element positioned between a lens of the front cover and a ring member of the front cover forming a seal therebetween.

8. The security camera of claim 7, wherein the sealing arrangement further comprises a second seal element disposed within an aperture formed in a bottom wall of the support body, the second seal element arranged and configured to seal against leadwires of the camera module extending through the aperture and into the first interior space.

9. The security camera of claim 8, wherein the gasket and first and second seal elements are arranged such that the enclosure bounding the second interior space has an IP 68 rating.

10. A method for assembling a security camera, comprising the steps of:
    providing a housing having a front cover and a back cover, the front cover including an axially extending flange;
    situating a camera assembly within said housing such that it extends into a first interior space of the housing, the camera assembly comprising a camera module and a support body, the support body and front cover defining an enclosure bounding a second interior space, the support body having a radially extending flange extending radially outward from an end of the support body, wherein a sealing rim extends axially away from a top surface of the support body;
    sealing, with a sealing arrangement, the first interior space from the second interior space such that fluid and particulate matter flow from the first interior space into the second interior space is inhibited; and
    pinching a gasket between the sealing rim and the axially extending flange.

11. The method of claim 10, wherein the step of sealing includes positioning a gasket between the support body and the front cover of the housing, positioning a first seal element between a lens and a ring member of the front cover, and positioning a second seal element in a leadwire aperture of the support body.

* * * * *

UNITED STATES PATENT AND TRADEMARK OFFICE
CERTIFICATE OF CORRECTION

PATENT NO. : 9,305,446 B1  
APPLICATION NO. : 14/516342  
DATED : April 5, 2016  
INVENTOR(S) : Gary Blaine Clinton et al.

Page 1 of 1

It is certified that error appears in the above-identified patent and that said Letters Patent is hereby corrected as shown below:

Claims

Column 7, Claim 1, line 62 after "that", insert --it--

Signed and Sealed this
Seventh Day of June, 2016

Michelle K. Lee
*Director of the United States Patent and Trademark Office*